United States Patent
Mittal et al.

(10) Patent No.: US 11,474,871 B1
(45) Date of Patent: Oct. 18, 2022

(54) CACHE COHERENT ACCELERATION FUNCTION VIRTUALIZATION

(71) Applicant: XILINX, INC., San Jose, CA (US)

(72) Inventors: Millind Mittal, Saratoga, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 195 days.

(21) Appl. No.: 16/582,958

(22) Filed: Sep. 25, 2019

(51) Int. Cl.
   *G06F 9/50* (2006.01)
   *G06F 12/0815* (2016.01)
   *G06F 9/455* (2018.01)
   *G06F 9/38* (2018.01)

(52) U.S. Cl.
   CPC .......... *G06F 9/5061* (2013.01); *G06F 9/3877* (2013.01); *G06F 9/45545* (2013.01); *G06F 9/45558* (2013.01); *G06F 9/5044* (2013.01); *G06F 12/0815* (2013.01); *G06F 2009/4557* (2013.01)

(58) Field of Classification Search
   None
   See application file for complete search history.

(56) References Cited

U.S. PATENT DOCUMENTS

| | | | |
|---|---|---|---|
| 9,916,259 B1* | 3/2018 | Nordin | G06F 12/121 |
| 10,031,993 B1* | 7/2018 | Poornachandran | H03K 19/17704 |
| 10,089,706 B1* | 10/2018 | Krasner | G06T 1/60 |
| 2011/0128874 A1* | 6/2011 | Schmitt | H04W 28/02 370/252 |
| 2016/0321094 A1* | 11/2016 | Rabi | G06F 13/28 |
| 2018/0101633 A1* | 4/2018 | Phoon | G06F 30/327 |
| 2018/0176006 A1* | 6/2018 | McElheny | H01L 25/18 |
| 2018/0357098 A1* | 12/2018 | Dube | G06F 9/5005 |
| 2019/0042329 A1* | 2/2019 | Kakaiya | G06F 13/4282 |
| 2019/0205244 A1* | 7/2019 | Smith | G06F 12/12 |
| 2020/0004715 A1* | 1/2020 | Matsumura | G06F 13/4068 |
| 2020/0341812 A1* | 10/2020 | McClure | G06F 9/5038 |

* cited by examiner

*Primary Examiner* — Meng Ai T An
*Assistant Examiner* — Zujia Xu
(74) *Attorney, Agent, or Firm* — Patterson + Sheridan, LLP (57) ABSTRACT

The embodiments herein describe a virtualization framework for cache coherent accelerators where the framework incorporates a layered approach for accelerators in their interactions between a cache coherent protocol layer and the functions performed by the accelerator. In one embodiment, the virtualization framework includes a first layer containing the different instances of accelerator functions (AFs), a second layer containing accelerator function engines (AFE) in each of the AFs, and a third layer containing accelerator function threads (AFTs) in each of the AFEs. Partitioning the hardware circuitry using multiple layers in the virtualization framework allows the accelerator to be quickly re-provisioned in response to requests made by guest operation systems or virtual machines executing in a host. Further, using the layers to partition the hardware permits the host to re-provision sub-portions of the accelerator while the remaining portions of the accelerator continue to operate as normal.

18 Claims, 7 Drawing Sheets

FIG. 7C

US 11,474,871 B1

CACHE COHERENT ACCELERATION FUNCTION VIRTUALIZATION

TECHNICAL FIELD

Examples of the present disclosure generally relate to provisioning an accelerator into hierarchical layers for performing virtualization.

BACKGROUND

Server CPU-Accelerator systems, such as those enabled by the Compute eXpress Link (CXL), Cache Coherent Interconnect for Accelerators (CCIX), QuickPath Interconnect/Ultra Path Interconnect (QPI/UPI), Infinity Fabric, NVLink™, and Open Coherent Accelerator Processor Interface (OpenCAPI) connected SoCs are all hardware cache coherent systems—i.e. the hardware maintains a universal, coherent view of accessed, modified, and cached data. Virtualization has subdivided resources in the server CPU side of these systems (e.g., hosts) into progressively smaller resources (e.g., virtual machines (VMs), guest operating systems (OSs), and containers) which may exist for shorter durations. For example, a VM may have a life span at least two to four orders of magnitude longer than the life span of a container, e.g., a VM can have a lifespan of several hours to months versus only several seconds for a container. Furthermore, guest operating systems (OSs) in a VM may have a boot time four to six orders of magnitude longer than the startup time of a container, e.g., several minutes of OS boot time versus only a few milliseconds of a container's start time.

Accelerators, such as graphics processing units (GPUs) or field programmable gate array (FPGAs) cards can be virtualized and provisioned in a time-division multiplexed manner to a guest OS or VM executing in a host. In prior techniques, accelerators are also presented with a singular accelerator function capability. e.g., a GPU or FPGA with a fixed bitstream corresponding to that singular acceleration function. The disadvantage is that the GPU or FPGA accelerator must be re-provisioned to represent a different accelerator function. Re-provisioning can take several minutes. When the life of some virtual components in the host are several seconds and their startup time is measured in milliseconds, spending several minutes to re-provision the accelerator so the accelerator can be used by the virtual component is not practical.

SUMMARY

Techniques for performing virtualization using an accelerator. One example is a method that includes binding a plurality of accelerator functions (AFs) in the accelerator to one or more request agents (RAs) where the plurality of functions is in an AF layer and the one or more RAs are in a cache coherent protocol layer. The method also includes assigning the plurality of AFs to a hypervisor executing in a host, assigning a plurality of guest operating systems (OSs) to AF engines (AFEs) in the plurality of AFs, wherein the AFEs are in an AFE layer, and assigning AF threads (AFTs) in the AFEs to application threads executing in the plurality of guest OSs where the AFTs are in an AFT layer and the AF layer, the AFE layer, and the AFT layer hierarchically partition hardware circuitry in the accelerator.

Another example is an accelerator that includes one or more RAs configured to permit the accelerator to communicate with a cache coherent network and hardware circuitry partitioned into hierarchical layers that includes an AF layer, an AFE layer, and an AFT layer Further, the AF layer includes a plurality of AFs bound to the one or more RAs, the AFE layer includes AFEs in the plurality of AFs, and the AFT layer includes AFTs in the AFEs. Further, the plurality of AFs and AFEs are assignable to guest OSs executing in a host that is separate from the accelerator, and the AFTs are assignable to application threads executing in the guest OSs.

Another example is a cache coherent system that includes a host that includes a hypervisor and a plurality of VMs. The system also includes an accelerator that includes one or more RAs configured to permit the accelerator to communicate with a cache coherent network and hardware circuitry partitioned into a plurality of AFs, a plurality of AFEs in each of the plurality of AFs, and a plurality of AFTs in each of the plurality of AFEs where the plurality of AFs is bound to the one or more RAs. Further, the plurality of AFs and AFEs are assignable to the plurality of VMs, and the AFTs are assignable to application threads executing in the plurality of VMs.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the various features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The embodiments herein describe a virtualization framework for cache coherent accelerators where the framework incorporates a layered approach for accelerators in their interactions between a cache coherent protocol layer (or interface) and the functions performed by the accelerator. In one embodiment, the virtualization framework includes a first layer containing different instances of accelerator functions (AFs), a second layer containing accelerator function engines (AFE) in each of the AFs, and a third layer containing accelerator function threads (AFTs) in each of the AFEs, Partitioning the hardware circuitry using multiple layers in the virtualization framework allows the accelerator to be quickly re-provisioned (within milliseconds) in response to requests made by guest OSs or VMs executing in a host. Further, using the layers to partition the hardware permits the host to re-provision sub-portions of the accelerator while the remaining portions of the accelerator can operate as normal—e.g., without interruption.

Figure 1A:
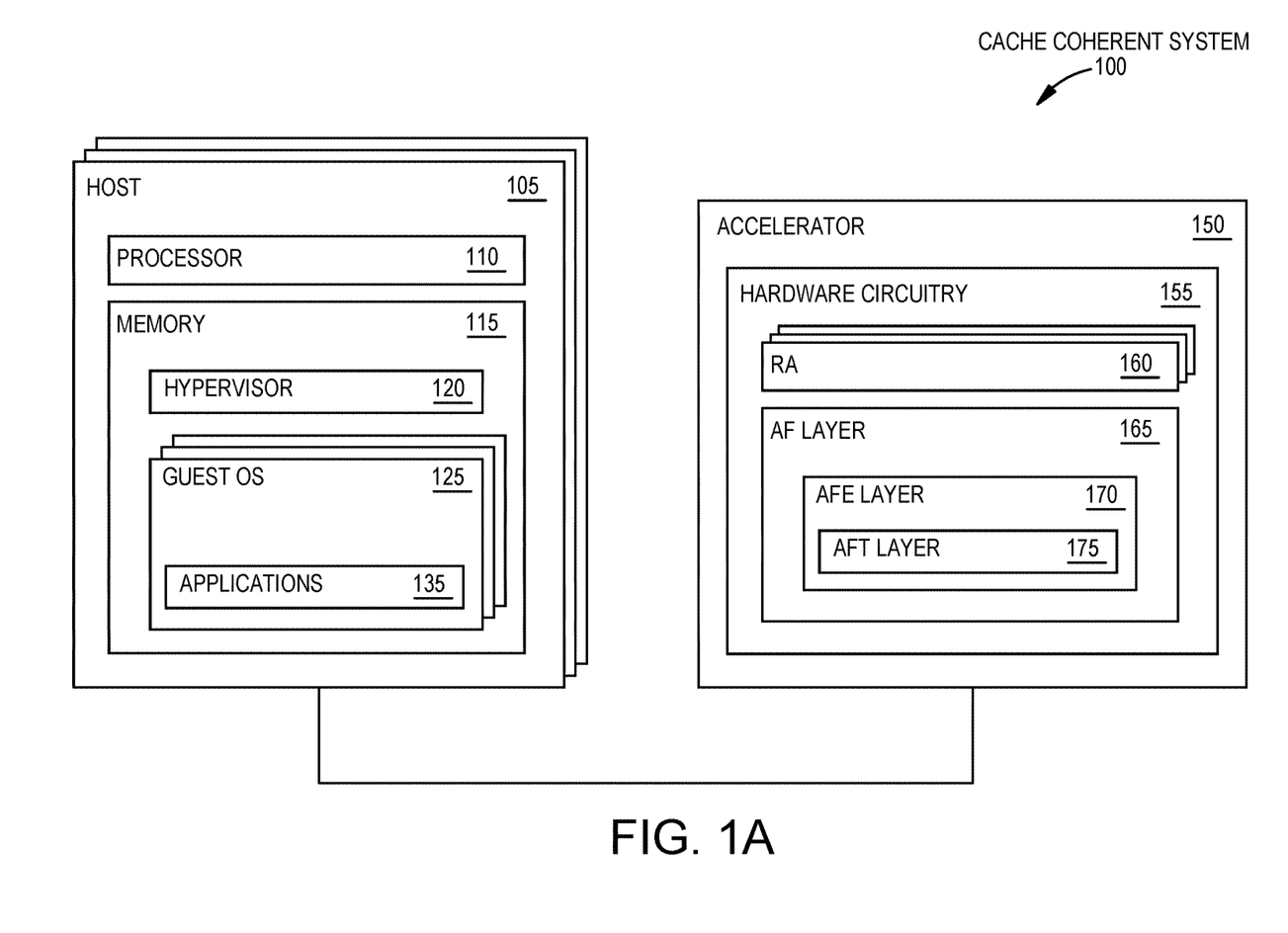
FIGS. 1A and 1B are block diagrams of cache coherent systems where an accelerator is divided into hierarchical layers, according to an example.

FIG. 1A is a block diagram of a cache coherent system 100 where an accelerator 150 is divided into hierarchical layers, according to an example. As shown, the cache coherent system 100 includes a host 105 (e.g., a server or other computing device) that is communicatively coupled to the accelerator 150. In one embodiment, the cache coherent system 100 uses a cache coherent protocol such as CXL, CCIX, QPI/UPI, AMD Infinity Fabric, NVLink, and OpenCAPI so that the hardware maintains a universal, coherent view of accessed, modified, and cached data in the host 105 and the accelerator 150.

The host 105 includes a processor 110 and memory 115. The processor 110 represents any number of processing elements (e.g., CPUs) that can include any number of processing cores. The memory 115 can include volatile memory elements, non-volatile memory elements, and combinations thereof. In this example, the memory 115 stores several virtual components that are created as part of performing virtualization—e.g., where the physical hardware in the host 105 is subdivided and assigned to several virtual components such as guest OS 125. The memory 115 also includes a hypervisor 120 that serves as an interface between the virtual components and the hardware in the host 105. The hypervisor 120 can create, schedule, manage, boot, and launch the guest OSs 125 (which can also be referred to as VMs).

The guest OS 125 includes the applications 135. That is, the host 105 is virtualized such that the resources in the host 105 can be subdivided among a plurality of guest OS 125 (e.g., VMs)

The accelerator 150 includes hardware circuitry 155 which is partitioned (or subdivided) by hierarchical layers that include an acceleration function (AF) layer 165 that includes an AF engine (AFE) layer 170 that in turn includes an AF thread (AFT) layer 175. In one embodiment, if the accelerator 150 is a FPGA, the hardware circuitry 155 may include programmable logic (e.g., look-up tables and configuration blocks). However, the hardware circuitry 155 may also include a combination of hardened circuitry and programmable logic. If the accelerator 150 is a GPU or other type of accelerator, the hardware circuitry 155 may include only hardened circuitry. Further, while the embodiments herein describe using the hierarchical layers to partition hardware, firmware and software associated with the hardware circuitry 155 may also be partitioned into the layers.

The AF layer 165 includes one or more AFs that describe a high-level function performed by the accelerator. For example, an FPGA can perform multiple different types of functions simultaneously (e.g., data compression, encryption/decryption, security authentication, network acceleration, and the like). The functions can each by categorized as a different AF being performed by the accelerator 150. Moreover, even if an accelerator 150 does only one type of function, the AF layer 165 can include different instances of that AF—e.g., the AF layer 165 can include three AFs that perform image processing in a GPU. As described in more detail below, the various AFs in the AF layer 165 can be assigned to different guest OSs 125 in the host 105. In one embodiment, each AF may be assigned to only one guest OS 125, while in other examples, multiple guest OSs 125 are assigned to the same AF in the layer 165.

The AFE layer 170 contains multiple AFEs that are assigned to the different AFs in the AF layer 165. The AFEs represent portions of the hardware circuitry 155 that are assigned to do a specific AF. For example, a compression AF may have four AFEs that can perform compression operations in parallel. That is, the AFEs can operate independent of each other. In one embodiment, an AFE is assigned to only one guest OS 125. That is, unlike in the AF layer 165 where multiple OSs 125 can be assigned to the same AF, in the AFE layer 170 only one guest OS 125 can be assigned to a particular AFE. This restriction may be desired in order to increase security, privacy, and reliability between guest OSs 125. That is, if one AFE fails, it does not affect other guest OSs 125. Further, assigning the guest OSs 125 to different AFEs can facilitate keeping data for applications 135 executed by different guest OSs 125 separate.

The AFT layer 175 includes threads that execute on the AFEs. For example, the AFEs may execute up to 32 threads. Further, the number of threads may vary depending on the AF. For example, an AFE in a compression AF may be able to execute more threads than an AFE in a security AF. In one embodiment, a guest OS 125 assigns the threads to different threads of the application 135. For example, the guest OS 125 may assign an application thread to a thread from the AFT layer 175. In one embodiment, each AFE can execute one thread at a time. For example, a scheduler in the accelerator 150 can perform time multiplexing to determine which of the 32 threads the AFE executes.

In this manner, the resources in the accelerator 150 (e.g., the hardware circuitry 155) can be subdivided and assigned to virtual components in the host 105. As discussed in more detail below, partitioning the resources in the accelerator 150 into hierarchical layers can reduce the time delay when re-provisioning the accelerator 150 to satisfy requests made by the guest OSs 125.

The accelerator 150 also includes a request agent (RA) 160 which is part of a cache coherent protocol layer that interfaces with the AF layer 165. In one embodiment, the RA 160 acts in behalf of the AFs in the AF layer 165 when communicating with a cache coherent network. The accelerator 150 can include any number of RAs 160. If the hardware circuitry 155 includes programmable logic, the accelerator 150 can be reconfigured dynamically to change the number of RAs 160.

In one embodiment, the accelerator 150 includes one or more integrated circuits (ICs). If the IC contains programmable logic, the IC is referred to as a programmable IC (e.g., an FPGA). In other examples, the accelerator 150 can include a system on a chip (SoC). The SoC can also include programmable logic as well as hardened circuitry.

Figure 1B:
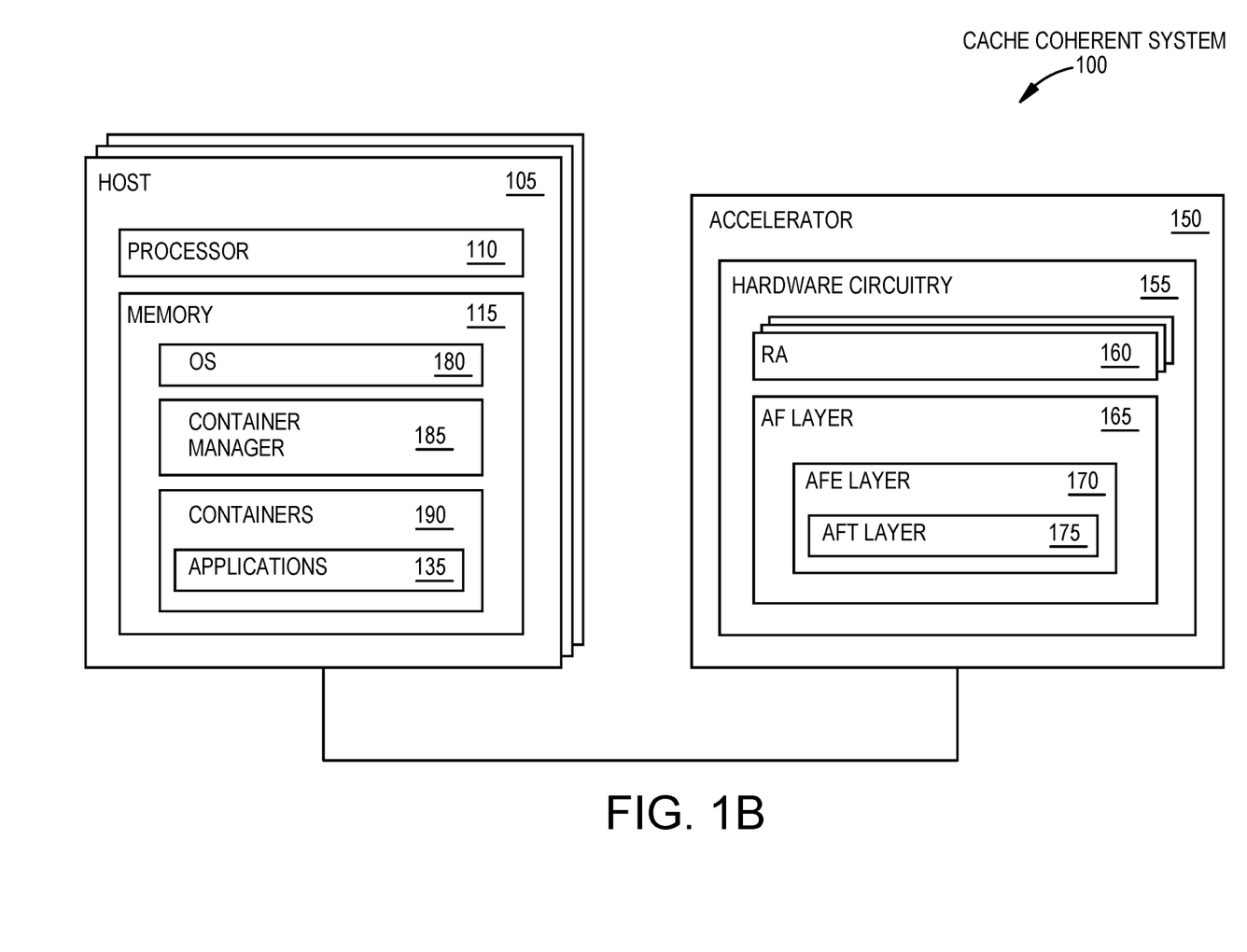

FIG. 1B is similar to FIG. 1A except that the virtualization framework includes a local OS 180 and containers 190 rather than a hypervisor and guest OSs. The OS 180 manages the physical resources in the system 100. The memory 115 also includes a container manager 185 that creates, schedules, manages, and launches the containers 190.

In one embodiment, the containers 190 are predefined packages of resources in the host 105 such as a certain number of compute cycles of the processor 110 and a portion of the memory 115. The container manager 185 can assign these containers 10 to the applications 135 so the applications 135 can execute on the host 105. That is, the host 105 is virtualized such that the resources in the host 105 can be subdivided among a plurality of containers 190. The container manager 185 can assign threads of the applications 135 (i.e., application threads) to the containers 190 for execution.

Like the guest OSs in FIG. 1A, the containers 190 can be assigned to different AFEs. The containers 190 can then assign the threads in the corresponding AFT layer 175 to different application threads. In this manner, the resources in the accelerator 150 (e.g., the hardware circuitry 155) can be subdivided and assigned to virtual components in the host 105.

Figure 2:
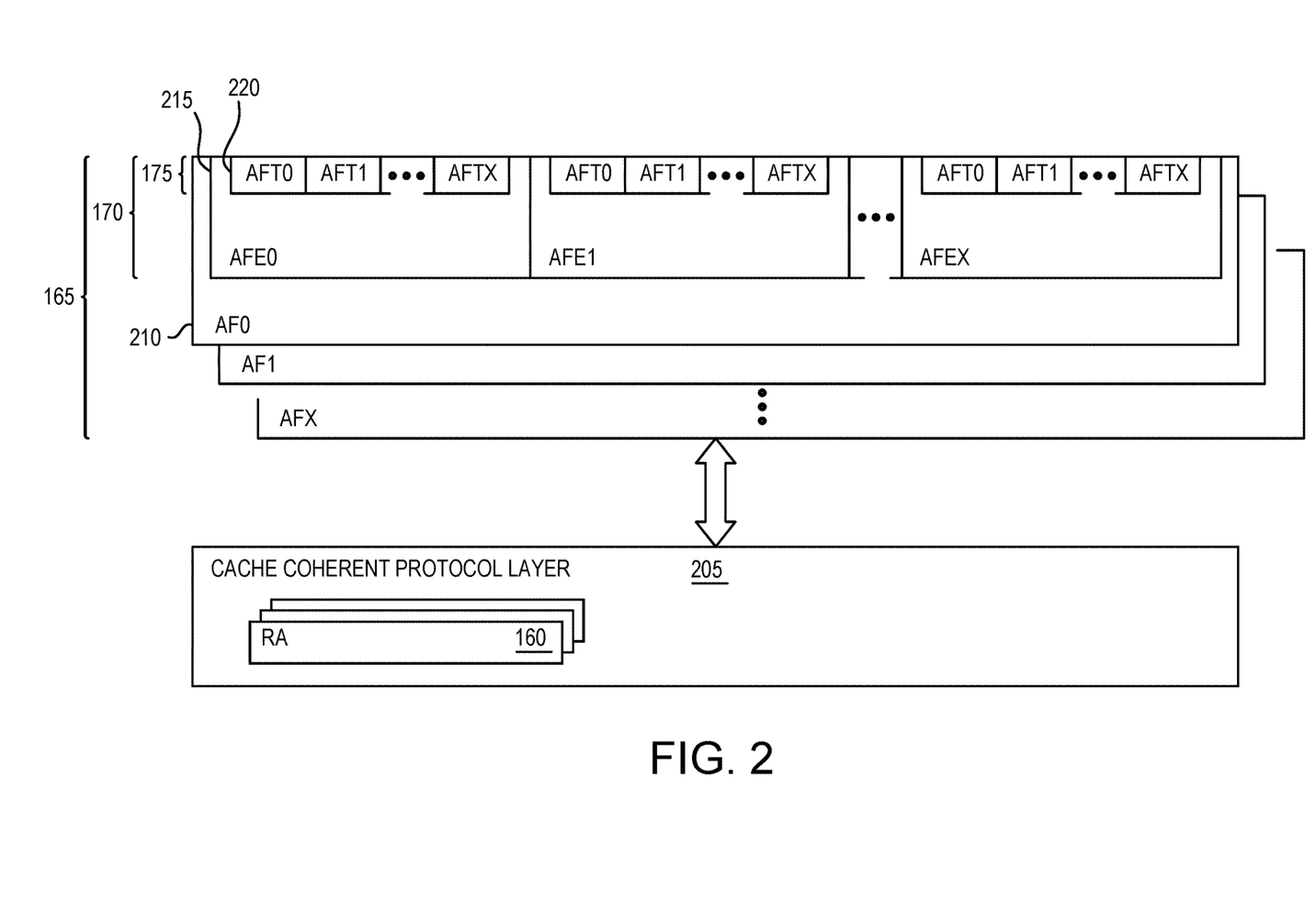
FIG. 2 illustrates the hierarchical layers partitioning the accelerator, according to an example.

FIG. 2 illustrates the hierarchical layers partitioning the accelerator, according to an example. FIG. 2 illustrates the AF layer 165, the AFE layer 170, and the AFT layer 175 in a particular configuration. As shown, the AF layer 165 includes 1–X number of AFs 210—i.e., AF0, AF1, ... AFX. The AF0 in turn includes 1–X number of AFEs 215—i.e., AFE0, AFE1, ..., AFEX. While only the AFEs in AF0 are shown, AF1—AFX can also have any number of AFEs (which may the same number or a different number than the AFEs in the other AFs).

Each AFE0-AFEX includes 1–X number of AFTs 220—i.e., AFT0, AFT1, ... AFTX. Each of the AFEs can have the same number of AFTs or a different number of threads. Thus, FIG. 2 illustrates how the underlying hardware in the accelerator can be partitioned to form the AFs 210, AFEs 215, and AFTs 220 in the layers 165, 170, and 175. As discussed in more detail below, the numbers of AFs 210, AFEs 215, and AFTs 220 and can be dynamically re-provisioned in response to requests made by the guest OSs (and the applications being executed on the guest OSs). Advantageously, this re-provisioning can occur in milliseconds rather than minutes when using prior virtualization techniques.

FIG. 2 also includes a cache coherent protocol layer 205 which interfaces with the AF layer 165. The cache coherent protocol layer 205 includes the RAs 160 in the accelerator. In one embodiment, the RAs 160 are bound to the AFs 210 and permit the AFs (and the remaining upper layers in the hierarchy) to communicate with other computing systems in the cache coherent system. Thus, in one embodiment, the AF layer 165 is an interface between the cache coherent protocol layer 205 and the AFE layer 170. The AFE layer 170 is in turn an interface between the AF layer 165 and the AFT layer 175.

Figure 3:
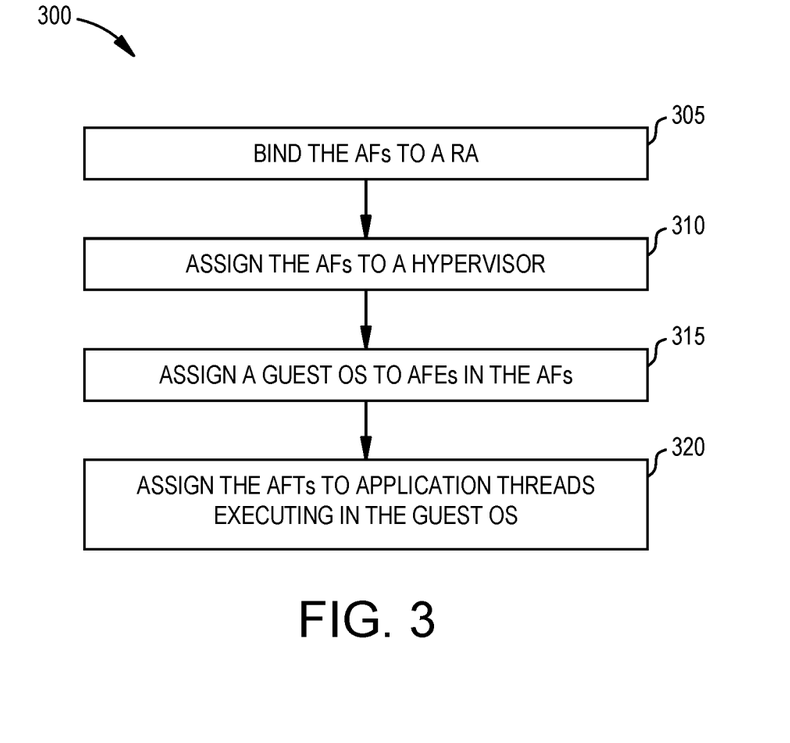
FIG. 3 is a flowchart for partitioning an accelerator into hierarchical layers, according to an example.

FIG. 3 is a flowchart of a method 300 for partitioning an accelerator into hierarchical layers, according to an example. At block 305, the accelerator 150 binds the AFs in the accelerator to one or more RAs. As mentioned above, the AFs can represent different acceleration functions (e.g., data compression, data encryption/decryption, security authentication, machine learning algorithms, and the like) or different instances of the same function. The AFs in the AF layer in the accelerator can use the RAs in the cache coherent protocol layer to communicate with other computing systems in the same cache coherent protocol network, such as the host. In one embodiment, multiples AFs are bound to the same RA. Alternatively, each AF can be bound to a respective one of the RAs in the accelerator. In either case, the RA represents (or acts in behalf of) the AF(s) in the cache coherent protocol network.

In one embodiment, the hierarchical layers in the accelerator are established using single root input/output virtualization (SR-IOV) as a framework. SR-IOV is a specification that allows the isolation of PCIe resources to improve manageability and performance. A single physical PCIe connection can be shared in a virtual environment using SR-IOV so that different guest OSs (VMs) can share a single PCIe hardware interface. In SR-IOV, the RAs and the AFs in the accelerator are both physical functions (PFs). In one embodiment, the hypervisor (or a container manager as is the case in FIG. 1B) tracks the RAs and the AFs as PFs and is informed what RAs are bound to what AFs. Once the virtualization framework within the SR-IOV framework is established, the data can flow in the accelerator function virtualization framework established by the hierarchical layers. However, SR-IOV is just one example of an underlying framework that can be used to establish the hierarchical layers in the virtualization framework described herein. The hierarchical layers can be established using other communication frameworks using different communication protocols than PCIe.

At block 310, a bitstream loaded into the accelerator, that defines the function performed by the AFs, is assigned to the hypervisor or the container manager depending on whether the virtualization framework in FIG. 1A or FIG. 1B is used. In one embodiment, assuming SR-IOV is used, the hypervisor/container manager tracks the RAs and the AFs as PFs and is informed what RAs are bound to what AFs. Because AF is a PF, the hypervisor or container manager can assign the different AFs to guest OSs or containers it manages in the host. For example, each guest OS can be assigned a respective one of the AFs. Alternatively, multiple guest OSs can be assigned to the same AF.

In one embodiment, the hypervisor or container manager manages the global resources and functions of the AFs. The AFs can include respective acceleration function global management states that are set by the hypervisor. Each AF is defined by this state in addition to the number and types of AFEs it contains. In one embodiment, the hypervisor or container manager has AF global controls that can, for example, enable or disable an AF, change the power states of the AFs (e.g., reduce its power consumption), and change the AF to RA bindings (e.g., to increase or reduce either of the Acceleration Function or Cache Coherent Protocol Layer capabilities).

At block 315, the hypervisor or container manager assigns guest OSs or containers to AFEs in the AFs. The guest OSs or containers manage each resources and functions of the assigned AFEs. The AFEs are defined by respective AFE management states (which are controlled by the assigned guest OS or container) in addition to the one or more AFTs supported by the AFE. In one embodiment, only one guest OS or container is assigned to an AFE, but this may be done for security and reliability reasons and is not a requirement. Further, each AFE can have a unique AFE ID, which if PCIe is used as the underlying framework, may be a unique BDF (Bus, Device. Function number). In one embodiment, the guest OSs can use AFE controls to enable or disable assigned AFEs, change the power state of the AFEs, and change the AFE to AF assignments.

In one embodiment, one AFE in each AF is assigned to a driver owned by the hypervisor rather than to a guest OS. That is, AFE0 may be assigned to the driver in the hypervisor while the remaining AFEs in the AF (e.g., AFE1-

AFEX) are assigned to guest OSs. The AFE assigned to the driver in the hypervisor may be considered as a PF in SR-IOV while the AFEs assigned to the guest OSs are virtual functions (VFs).

Moreover, the embodiments herein can be applied to a non-virtualized environment. In such an example, one AFE (e.g., AFE0) can be assigned to a driver owned by an OS in the non-virtualized environment while the remaining AFEs in the AF can be assigned or owned by application processes in the non-virtualized environment.

At block 320, the guest OSs or containers assign the AFTs in their assigned AFE(s) to application threads executing in the guest OSs or containers. In one embodiment, the guest OSs/containers indicate compute resources that can be used to execute an application (or an application thread). These compute resources can include one or more AFTs. Thus, when a guest OS or container assigns compute resources to an application thread, the application thread is also assigned any AFTs in those compute resources. In this manner, the application thread can use the AFTs to execute its functions.

In one embodiment, the AFT is an execution thread and includes execution context. Each AFT can have a unique thread ID, where in PCIe, the thread ID can be a PASID. If an AFE has only one AFT, the PASID is optional. Further, in SR-IOV, the AFTs are VFs which are assignable to the application threads in the corresponding guest OSs. The application thread can manage the resources and functions of the assigned AFTs. That is, the application thread can control a state of the AFT using an address of the AFT; thread ID of the AFT, signaling to application thread (using message signaled interrupts (MSI or MSI-X)), signaling from application thread to AFT, and changing the AFT to AFE assignments.

Figure 4:
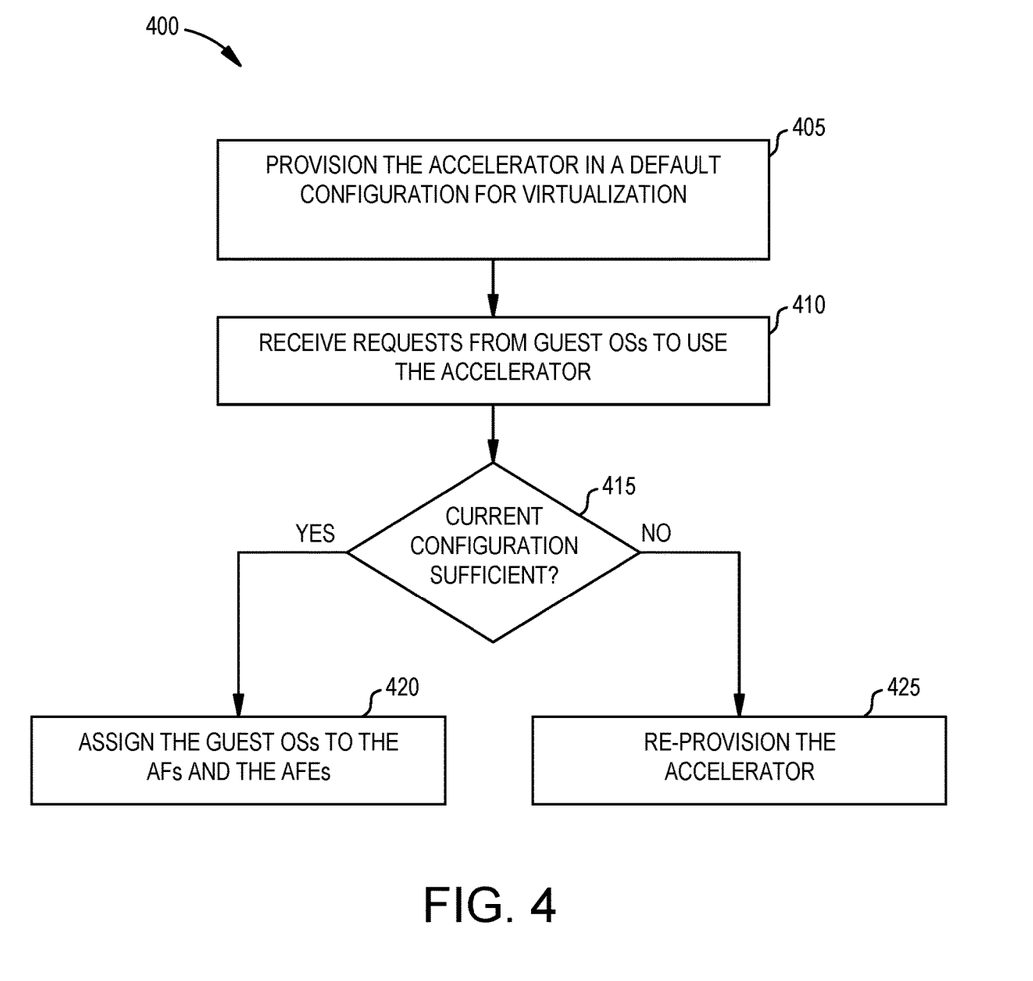
FIG. 4 is a flowchart for assigning virtual components executing in a host to the hierarchical layers in an accelerator, according to an example.

FIG. 4 is a flowchart of a method 400 for assigning virtual components executing in a host to the hierarchical layers in an accelerator, according to an example. In one embodiment, the method 400 can be used by the host (or more specifically, the hypervisor) to assign hardware resources in the accelerator to the virtual components in the host—e.g., the guest OSs and containers.

At block 405, a bitstream provisions the accelerator in a default configuration for virtualization. That is, the accelerator may be initially loaded with a bitstream that configures the AF, AFE, and AFT layers for the accelerator. For example, an FPGA accelerator may have a default configuration of four AFs that perform four different accelerator functions (e.g., compression, encryption, security, and network acceleration) where each AF has eight AFEs, and each AFE can support 32 AFTs. However, this is just one example of a default configuration. A GPU may have a different default configuration—e.g., two AFs (which may be two instances of the same image processing function) that each have four AFEs that support 16 AFTs.

In one embodiment, the accelerator is configured into the default configuration when being powered one. In another embodiment, the bitstream defining the default configuration may be sent to the accelerator after being powered on.

At block 410, the hypervisor receives requests from guest OSs to use the accelerator. For example, a guest OS may request to use the accelerator to perform one or more of the AFs (e.g., compression, encryption, security, graphics processing, etc.). As part of the request, the guest OS may also inform the hypervisor how many AFEs it wants. For example, each AFE may be able to process one gigabit of data per second. The guest OS may state it wants two AFEs that process data at one gigabit per second (for two different application threads) or one AFE that processes data at two gigabit per second.

At block 415, the hypervisor determines whether the current configuration of the accelerator—i.e., the current configuration of the hierarchical layers—is sufficient to satisfy the requests made by the guest OSs. For instance, if a guest OS wants to use the same functions as the AFs currently established on the accelerator, then the current configuration may be sufficient. However, if the guest OS wants to use a searching function but the AFs currently on the accelerator are for compression and encryption, then the configuration is not sufficient. In another example, if the guest OS wants to use two AFEs that process data at 1 gigabits/sec and the corresponding AF has two AFEs available, then the current configuration is sufficient. However, if the guest OS wants an AFE that processes data at 2 gigabits/sec and the corresponding AF has only AFEs that process data at 1 gigabits/sec, then the current configuration is insufficient.

If the current configuration is sufficient, the method 400 proceeds to block 420 where the hypervisor assigns the guest OSs to the AFs and AFEs as discussed above in the method 300. The guest OSs and containers can then assign applications or application threads to AFTs in the assigned AFEs. In this manner, the guest OSs, containers, and applications can use the resources in the accelerator to perform their respective tasks.

However, if the current configuration is not sufficient, the method 400 proceeds to block 425 where the accelerator is re-provisioned. Re-provisioning the accelerator means changing at least one of the hierarchical layers. For example, re-provisioning can include changing the number and types of the AFs, changing the number of AFEs in each AF, and altering the number of threads. Re-provisioning the hierarchical layers also reallocates or repartitions the underlying hardware circuitry in the accelerator. However, re-provisioning may affect only a part of the accelerator which means the unaffected parts (e.g., layers that are not changed) can operate without interruption during re-provisioning. Further, re-provisioning the hierarchical layers can take milliseconds rather than prior techniques which can take several minutes. The details for re-provisioning an accelerator along with accompanying examples are provided in FIGS. 5-7C.

Figure 5:
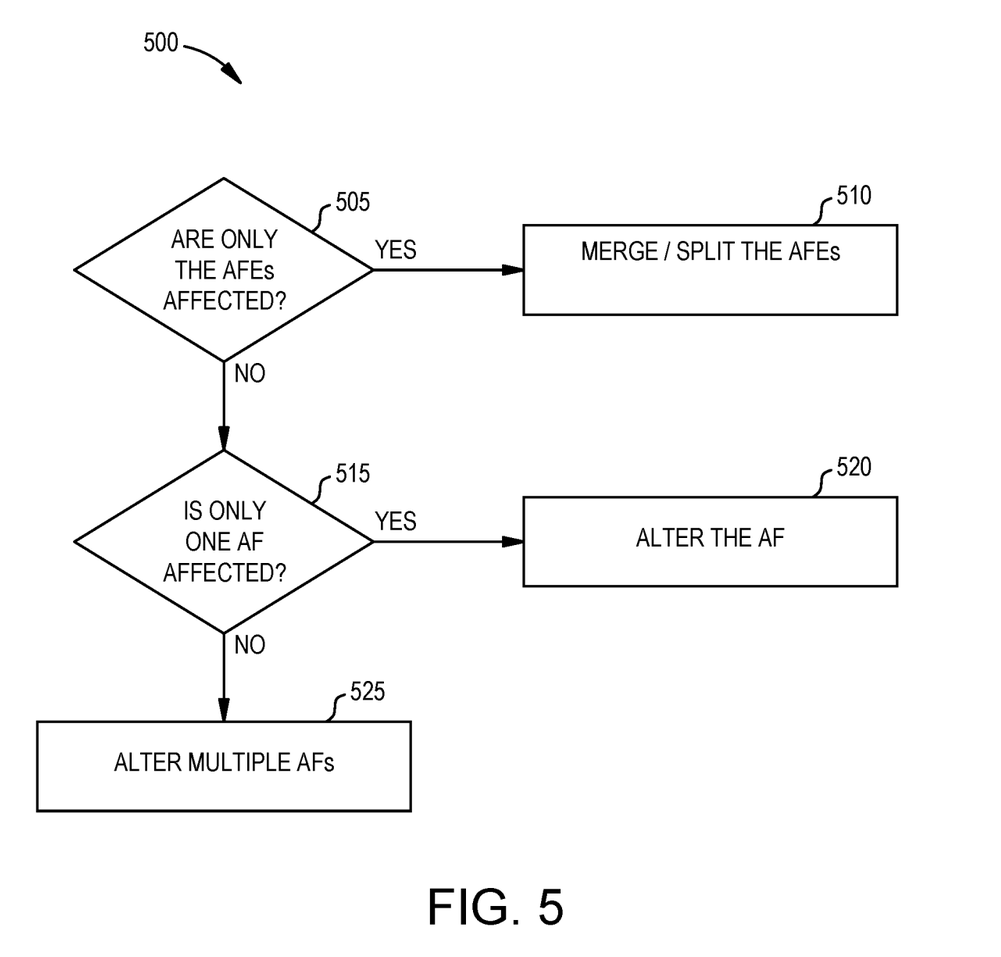
FIG. 5 is a flowchart for re-provisioning the hierarchical layers in an accelerator, according to an example.

FIG. 5 is a flowchart of a method 500 for re-provisioning the hierarchical layers in an accelerator, according to an example. The method 500 assumes that the accelerator is already in a default configuration and the hypervisor has determined that the current configuration of the hierarchical layers is not sufficient to satisfy the requests made by the guest OSs. As such, the accelerator is re-provisioned.

Figure 6:
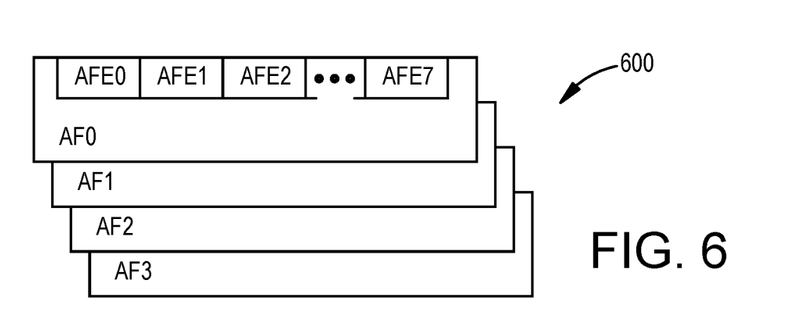
FIG. 6 is a default configuration of an accelerator, according to an example.

For ease in explanation, the method 500 is explained in parallel with FIG. 6 which illustrates a default configuration 600 of an accelerator, according to an example. In the default configuration 600, the accelerator has four AFs (AF0-AF3) where each AF has eight AFEs (AFE0-AFE7). The AFEs can include any number of AFTs.

At block 505, the hypervisor determines whether only AFEs are affected by the re-provisioning. Stated differently, the current configuration of the AFs may be sufficient to satisfy the requests made by the guest OSs, but the AFEs within the AFs are not. In that case, the method 500 proceeds to block 510 where the hypervisor re-provisions the hierarchical layers by merging or splitting the AFEs in one or more AFs.

Figure 7A:
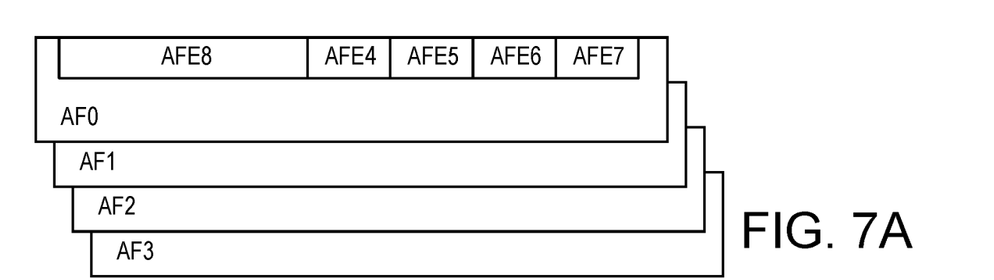
FIGS. 7A-7C illustrate re-provisioning the default configuration illustrated in FIG. 6, according to several examples.
Figure 7B:
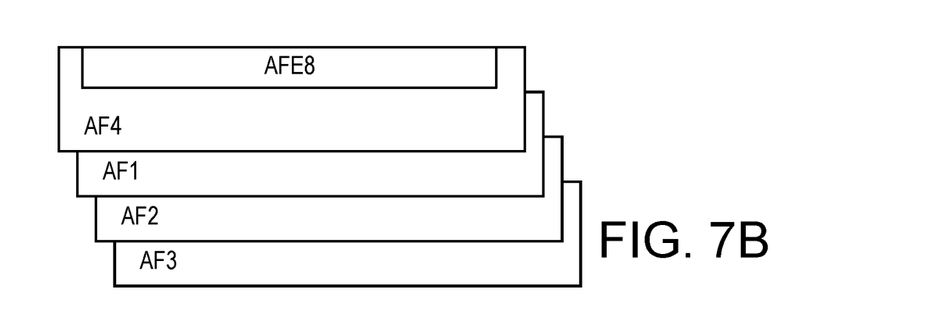
Figure 7C:
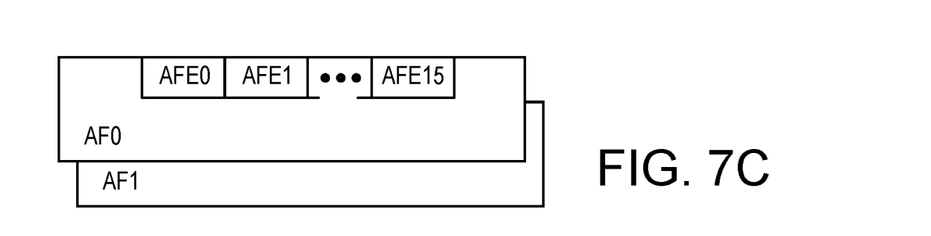

FIGS. 7A-7C illustrate re-provisioning the default configuration illustrated in FIG. 6, according to several examples. Specifically, FIG. 7A illustrates re-provisioning the hierarchical layers where only the AFEs are changed but the AFs are not as described at block 510 in the method 500. For example, a guest OS may want an AFE that can process data at four times the speed of the AFEs illustrated in the default configuration 600 in FIG. 6. In response, at block 510, the hypervisor merges AFE0-AFE3 to form AFE8 which has four times the processing power as the remaining AFEs—i.e., AFE4-AFE7. That is, the hardware circuitry in the accelerator previously assigned to AFE0-AFE3 has been merged to form AFE8. When performing the merge, only the guest OS(s) that were assigned AFE0-AFE3 are affected. The guest OS(s) assigned AFE4-AFE7 can continue to use these AFEs as normal, without any interruption in operation. Further, merging the AFEs into one AFE is a sub-second operation. For example, any programmable logic can be reconfigured dynamically from four independent AFEs to a single AFE which is then assigned to a requesting guest OS.

Although not shown in FIG. 7A, a split operation can also be performed. For example, sixteen guest OSs may want to use the AFEs in AF0. So long as the processing constraints are satisfied, the hypervisor could reconfigure the AF0 to include sixteen AFEs that process data at half the speed of the AFEs in the default configuration 600. Each one of the sixteen AFEs could be provided to one of the guest OSs.

Returning to the method 500, if more than just the AFEs are affected by re-provisioning, the method 500 proceeds to block 515 where the hypervisor determines whether only one AF is affected. If so, the method proceeds to block 520 where the hypervisor alters the AF while the remaining AFs in the accelerator can continue to function as normal, without interruption.

FIG. 7B illustrates altering the AF0 to form AF4, while the remaining AFs in the accelerator—i.e.: AF1-AF3—remain unchanged. For example, AF0 may have been a compression function; however, no guest OSs (or only a small number of guest OSs) may currently request to use this function. Instead, a guest OS may request a function that is not currently performed by any of the functions AF0-AF3. In response, the hypervisor can reconfigure AF0 to perform a new function AF4. As shown, AF4 has only one AFE: AFE8. Put differently, the hardware previously partitioned into AF0 has now been re-provisioned into AF4. This hardware that was previously configured into eight AFEs that performed the accelerator function AF0 is now assigned (and configured) to execute one AFE that performs the accelerator function AF4. The other AFs (and their corresponding AFEs) are unaffected by this re-provisioning action and can continue to operate as normal. However, if any guest OSs were previously assigned an AFE in AF0, these guest OSs would be quiesced before AF0 is disabled and AF4 is enabled. Further, as part of enabling AF4, the hypervisor may bind AF4 to a RA and terminate the RA binding for AF0.

Returning to the method 500, if re-provisioning affects multiple AFs, at block 525 the hypervisor alters multiple AFs, which may include quiescing any guest OSs assigned AFEs in the AFs that are being altered.

FIG. 7C illustrates altering multiple AFs when re-provisioning the accelerator. Comparing FIG. 7C to the default configuration 600 in FIG. 6, the hierarchical layers now includes only two AFs—i.e., AF0 and AF1 In this example, the hardware that was previously assigned to AF2 and AF3 has been re-provisioned for use by AF0 and AF1. That is, both AF0 and AF1 now have sixteen AFEs rather than eight as shown in the default configuration 600. For example, the guest OSs may not currently want to use the functions performed by AF2 and AF3 (or only a few guest OSs may want to use these functions). Further, AF0 and AF1 may not have sufficient AFEs to satisfy the requests from the guest OSs. Thus, the hypervisor can disable AF2 and AF3 so the hardware previously allocated to those functions can instead be allocated to AF0 and AF1 to form eight additional AFEs in each AF. When doing so, any guest OSs that were previously assigned to AF2 and AF3 may be quiesced. However, any guest OSs that were using AFE0-AFE7 in AF0 and AF1 can continue to operate as normal as the additional AFEs are added to these AFs.

Thus, FIGS. 5-7C illustrate re-provisioning the AFs and AFEs in the hierarchical layers to satisfy requests made by the guest OSs. Because the hierarchical layer partition the hardware into smaller chunks, re-provisioning can occur quickly and with minimal or no interruption to the AFs and AFEs that are unaffected by the re-provisioning action (e.g., the hypervisor does not need to quiesce all guest OSs). Moreover, the accelerator can pre-fetch bitstreams so they are ready to be swapped out during re-provisioning.

In addition to dynamically re-provisioning the AFs and AFEs, the hypervisor can also dynamically re-provision the RA and AF bindings. For example, the accelerator may have two RAs and four AFs where each RA is bound to two of the AFs. If one AF is substantially busier than the other AFs, the hypervisor can re-provision this binding so that one RA is bound to the busy AF while the other RA is bound to the remaining three AFs. Alternatively, if the accelerator includes programmable logic, the hypervisor could add another RA or combine multiple RAs (to form a more powerful RA) to service the busy AF.

In the preceding, reference is made to embodiments of the disclosure. However, the disclosure is not limited to specific described embodiments. Instead, any combination of the preceding features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments, and advantages are merely illustrative and are not considered elements or limitations of the appended claims except where explicitly recited in a claim (s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for performing virtualization using an accelerator, the method comprising:
    binding a plurality of accelerator functions (AFs) in the accelerator to a respective one of a plurality of request agents (RAs) in the accelerator, wherein the plurality of AFs is in an AF layer and the plurality of RAs are in a cache coherent protocol layer that is part of the accelerator;
    assigning the plurality of AFs to at least one of a hypervisor or container manager executing in a host, wherein the at least one of a hypervisor or container manager tracks the plurality of AFs and RAs as physical functions (PFs) and is informed by the accelerator of which of the plurality of AFs are bound to which of the plurality of RAs;
    assigning at least one of a plurality of guest operating systems (OSs) or containers executing in the host to AF engines (AFEs) in the plurality of AFs, wherein the AFEs are in an AFE layer;
    assigning AF threads (AFTs) in the AFEs to application threads executing in the at least one of the plurality of guest OSs or containers, wherein the AFTs are in an AFT layer, and wherein the AF layer, the AFE layer, and the AFT layer hierarchically partition hardware circuitry in the accelerator, and wherein the AFT layer is assigned to hardware circuitry within the AFE layer;
    receiving requests from the at least one of the plurality of guest OSs or containers to use the hardware circuitry in the accelerator;

upon determining a current configuration of the AF, AFE, and AFT layers is insufficient to satisfy the requests, re-provisioning, by the hypervisor or the container manager to change the binding between the plurality of AFs and the plurality of RAs; and performing the requests based on the re-provisioning.

2. The method of claim 1, wherein the AF layer is an interface between the cache coherent protocol layer and the AFE layer, and the AFE layer is an interface between the AF layer and the AFT layer.

3. The method of claim 1, wherein the host and the accelerator are part of a cache coherent system.

4. The method of claim 1,
wherein the re-provisioning the accelerator comprises altering at least one AF in the AF layer or at least one AFE in the AFE layer where, during the re-provisioning of the accelerator, another AF in the AF layer or another AFE in the AFE layer continues to operate.

5. The method of claim 4, wherein the re-provisioning the accelerator comprises:
at least one of merging or splitting a subportion of the AFEs in a first AF of the plurality of AFs, wherein remaining AFEs in the first AF continue to operate while the subportion of the AFEs is merged or split.

6. The method of claim 4, wherein the re-provisioning the accelerator comprises:
reconfiguring a first AF of the plurality of AFs to perform a different accelerator function, wherein any of the plurality of guest OSs or containers previously assigned an AFE in the first AF are quiesced before reconfiguring the first AF.

7. The method of claim 4, wherein the re-provisioning the accelerator comprises:
disabling a first AF of the plurality of AFs; and
creating a new AF in the accelerator, wherein a portion of the hardware circuitry in the accelerator previously assigned to the first AF is now assigned to the new AF.

8. An accelerator, comprising:
a plurality of request agents (RAs) configured to permit the accelerator to communicate with a cache coherent network, wherein the plurality of RAs are in a cache coherent protocol layer that is part of the accelerator; and
hardware circuitry partitioned into hierarchical layers comprising an accelerator function (AF) layer, an AF engine (AFE) layer, and an AF thread (AFT) layer, wherein the AF layer comprises a plurality of AFs bound to a respective one of the plurality of RAs, wherein the AFE layer comprises AFEs in the plurality of AFs, wherein the AFT layer comprises AFTs in the AFEs, and wherein the AFT layer is assigned to hardware circuitry within the AFE layer,
wherein the plurality of AFs are assigned to at least one of a hypervisor or container manager executing by a processor in a host;
wherein the plurality of AFs and AFEs are assigned to at least one of guest operating systems (OSs) or containers executing in the host that is separate from the accelerator, and the AFTs are assigned to application threads executing in the at least one guest OSs or containers,
wherein the host is to track the plurality of AFs and RAs as physical functions (PFs) and is informed by the accelerator of which of the plurality of AFs are bound to which of the plurality of RAs,
wherein the hypervisor or the container manager is configured to:
receive requests from the at least one of the plurality of guest OSs or containers to use the hardware circuitry in the accelerator;
upon determining a current configuration of the AF, AFE, and AFT layers is insufficient to satisfy the requests, re-provision the hierarchical layers to change a binding between the plurality of AFs and the plurality of RAs; and
perform the requests based on the re-provisioning.

9. The accelerator of claim 8, further comprising at least one of:
a field programmable gate array (FPGA); or
graphics processing unit (GPU).

10. The accelerator of claim 8, wherein the AF layer is an interface between the cache coherent protocol layer containing the plurality of RAs and the AFE layer, and the AFE layer is an interface between the AF layer and the AFT layer.

11. The accelerator of claim 8, wherein the host and the accelerator are part of a cache coherent system.

12. The accelerator of claim 8, wherein the accelerator is configured to re-provision the hierarchal layers by:
at least one of merging or splitting a subportion of the AFEs in a first AF of the plurality of AFs, wherein remaining AFEs in the first AF continue to operate while the subportion of the AFEs is merged or split.

13. The accelerator of claim 8, wherein the accelerator is configured to re-provision the hierarchal layers by:
reconfiguring a first AF of the plurality of AFs to perform a different accelerator function, wherein any of the at least one of guest OSs or containers previously assigned an AFE in the first AF are quiesced before reconfiguring the first AF.

14. The accelerator of claim 8, wherein the accelerator is configured to re-provision the hierarchal layers by:
disabling a first AF of the plurality of AFs; and
creating a new AF in the accelerator, wherein a portion of the hardware circuitry in the accelerator previously assigned to the first AF is now assigned to the new AF.

15. A cache coherent system, comprising:
a host, comprising:
a processor;
a hypervisor or a container manager; and
a plurality of virtual machines (VMs); and
an accelerator, comprising:
a plurality of request agents (RAs) configured to permit the accelerator to communicate with a cache coherent network, wherein the plurality of RAs are in a cache coherent protocol layer that is part of the accelerator; and
hardware circuitry partitioned into a plurality of accelerator functions (AFs), a plurality of AF engines (AFEs) in each of the plurality of AFs, and a plurality of AF threads (AFTs) in each of the plurality of AFEs, wherein the plurality of AFs is bound to a respective one of the plurality of RAs, wherein the AFT layer is assigned to hardware circuitry within the AFE layer,
wherein the plurality of AFs are assigned to the hypervisor or the container manager;
wherein the plurality of AFs and AFEs are assigned to the plurality of VMs, and the AFTs are assigned to application threads executing in the plurality of VMs,
wherein the hypervisor or the container manager is configured to:
track the plurality of AFs and RAs as physical functions (PFs) and is informed by the accelerator of which of the plurality of AFs are bound to which of the plurality of RAs, receive requests from the at least one of the plurality of VMs to use the hardware circuitry in the accelerator;

upon determining a current configuration of the AF, AFE, and AFT layers is insufficient to satisfy the requests, re-provision the accelerator to change a binding between the plurality of AFs and the plurality of RAs; and perform the requests based on the re-provisioning.

16. The cache coherent system of claim 15, wherein the plurality of AFs each perform different functions using the hardware circuitry.

17. The cache coherent system of claim 15, wherein at least one of the plurality of AFs has a different number of AFEs than another one of the plurality of AFs.

18. The cache coherent system of claim 15, wherein re-provisioning the accelerator includes at least one of:

changing a function performed by at least one of the plurality of AFs;

disabling at least one of the plurality of AFs;

creating a new AF; or changing the number of the plurality of AFEs in at least one of the plurality of AFs.

* * * * *